United States Patent
Iannitti

(10) Patent No.: US 12,175,785 B2
(45) Date of Patent: Dec. 24, 2024

(54) DETERMINING SIMILAR LOAN DOCUMENTS

(71) Applicant: DocMagic, Inc., Torrance, CA (US)

(72) Inventor: Dominic Iannitti, Rolling Hills, CA (US)

(73) Assignee: DOCMAGIC, INC., Torrance, CA (US)

( * ) Notice: Subject to any disclaimer, the term of this patent is extended or adjusted under 35 U.S.C. 154(b) by 0 days.

(21) Appl. No.: 17/950,816

(22) Filed: Sep. 22, 2022

(65) Prior Publication Data

US 2023/0100396 A1      Mar. 30, 2023

Related U.S. Application Data

(63) Continuation of application No. 17/950,549, filed on Sep. 22, 2022.

(Continued)

(51) Int. Cl.
| | |
|---|---|
| *G06Q 40/00* | (2023.01) |
| *G06F 16/31* | (2019.01) |
| *G06Q 40/03* | (2023.01) |
| *G06Q 50/18* | (2012.01) |
| *G06V 30/14* | (2022.01) |
| *G06V 30/19* | (2022.01) |
| *G06V 30/412* | (2022.01) |
| *G06V 30/413* | (2022.01) |

(52) U.S. Cl.
CPC .......... *G06V 30/412* (2022.01); *G06F 16/325* (2019.01); *G06Q 40/03* (2023.01);
(Continued)

(58) Field of Classification Search
CPC ...... G06Q 40/03; G06Q 50/18; G06V 30/412; G06V 30/413; G06V 30/19; G06V 30/1448; G06V 2201/10; G06F 16/325
(Continued)

(56) References Cited

U.S. PATENT DOCUMENTS

| | | | | |
|---|---|---|---|---|
| 2006/0265593 | A1* | 11/2006 | Momma | G06F 40/143 713/176 |
| 2007/0038538 | A1* | 2/2007 | Silverbrook | G06Q 40/00 705/35 |

(Continued)

OTHER PUBLICATIONS

ISA; International Search Report and Written Opinion dated Apr. 4, 2023 in PCT/US22/44431.

(Continued)

*Primary Examiner* — Cho Kwong
*Assistant Examiner* — Mohammed H Mustafa
(74) *Attorney, Agent, or Firm* — SNELL & WILMER L.L.P.

(57) ABSTRACT

The system prepares PDF documents to be digitally populated or signed. The method may comprise converting a document into an image; detecting words on the document; searching the words for keywords; searching for an object on the document; determining an object field based on the keywords and the object; creating a tag with metadata about the object field; and associating the tag with the object field. The method may also comprise determining, by a processor, metadata about a document; creating, by the processor, a hash from the metadata; storing, by the processor, an association of the hash, the metadata and the document in a knowledge database; creating, by the processor, a new hash for a new document; comparing, by the processor, the hash with the new hash; and determining, by the processor, that the new document has similar characteristics as the document based on the comparing.

24 Claims, 8 Drawing Sheets

Related U.S. Application Data

(60) Provisional application No. 63/248,376, filed on Sep. 24, 2021.

(52) U.S. Cl.
CPC ......... *G06Q 50/18* (2013.01); *G06V 30/1448* (2022.01); *G06V 30/19* (2022.01); *G06V 30/413* (2022.01); *G06V 2201/10* (2022.01)

(58) Field of Classification Search
USPC ................................................ 705/4, 35–45
See application file for complete search history.

(56) References Cited

U.S. PATENT DOCUMENTS

| | | | | |
|---|---|---|---|---|
| 2010/0183246 A1* | 7/2010 | King | ...................... | G06Q 30/02 382/305 |
| 2010/0325102 A1* | 12/2010 | Maze | ...................... | G06F 16/93 707/738 |
| 2011/0302197 A1* | 12/2011 | Silverbrook | ........ | G06F 16/3331 707/769 |
| 2019/0370528 A1* | 12/2019 | Cernautan | ............ | G06V 30/414 |

OTHER PUBLICATIONS

USPTO; Non-Final Office Action dated Nov. 9, 2023 in U.S. Appl. No. 17/950,549.
ISA; International Preliminary Report on Patentability dated Nov. 13, 2023 in PCT/US22/44431.
USPTO; Final Office Action dated Feb. 23, 2024 in U.S. Appl. No. 17/950,549.
USPTO; Advisory Action dated Apr. 23, 2024 in U.S. Appl. No. 17/950,549.
USPTO; Non-Final Office Action dated May 9, 2024 in U.S. Appl. No. 17/950,549.
USPTO; Notice of Allowance dated Aug. 7, 2024 in U.S. Appl. No. 17/950,549.

* cited by examiner

DETERMINING SIMILAR LOAN DOCUMENTS

CROSS-REFERENCE TO RELATED APPLICATIONS

This disclosure is a continuation of, claims priority to and the benefit of, U.S. Ser. No. 17/950,549 entitled "Enabling Electronic Loan Documents" filed on Sep. 22, 2022. The '549 application claims priority to and the benefit of U.S. Ser. No. 63/248,376 filed on Sep. 24, 2021 and entitled "eClose and AutoPrep Process Flow." Both of which are hereby incorporated by reference in their entirety for all purposes.

TECHNICAL FIELD

This disclosure generally relates to electronically enabling documents, and more particularly, to a system and method for electronic tagging of a PDF (portable document format) document using conversion, optical character recognition ("OCR"), object detection and vicinity assessment, while also including participant actions learning, document identification and business intelligence.

BACKGROUND

In a business transaction (e.g., a loan or mortgage transaction), a significant number of documents may need to be signed by the parties. These documents may include text files, image files, PDF, DOCX, DOC, TXT, PNG, HTML, JPEG or similar types of files. While some loan documents may include a standard language and standard fields, many of the transactions may include custom documents. To expedite the closing of such loan or mortgage transactions, the parties often prefer to electronically populate and sign the initial documents, the closing documents and any other documents. However, many of the documents are not configured for electronic population or signatures. Manual intervention is often required for adjusting the initial documents (or adding new documents) to allow for electronically populating the documents and for electronic signatures. For example, a title company agent or other person often needs to manually indicate the location on the document for setting up an electronic signature process (e.g., DocuSign). Furthermore, to allow for electronically populating the documents and for electronic signatures, the documents may need to include metadata about the documents. Adding metadata to documents is a lengthy and difficult process, particularly when adding metadata to PDF documents, Word documents and image files.

A PDF document may include text, images, multimedia elements, web page links, may execute JavaScript and include other content. As an example, a PDF may include different layers comprising a header, body, xref table and trailer. The header may be in the first line of the PDF file and include a version number of the PDF file format specification used by the document. The body of the PDF document may include objects. The objects may include text, text streams, images, other multimedia elements, etc. The body section may hold all the document's data visible by the participant. The xref table may include a cross-reference table. The cross-reference table may include the references to all the objects in the document. The cross-reference table allows random access to objects in the file, so the entire PDF document does not need to be reviewed in order to locate the particular object. Each object may be represented by one entry in the cross-reference table, which may be 20 bytes long. To access the cross-reference table, the system may open the PDF with a text editor. The cross-reference table may include four subsections including the object number, the number of objects in the subsection and the object represented by a number. The trailer provides information to the application reading the PDF document about how the application may find the cross-reference table and other special objects. The PDF may include incremental updates by appending objects to the end of the PDF file, without having to rewrite the entire file. Because of this process for updates, changes to a PDF document can be saved quickly.

PDF documents may be categorized in three different types. The types of PDF documents may include true PDF pages, image-only PDF pages (or scanned PDF pages) and searchable PDF pages. The PDF category may depend on the way the file was originally created. The way the PDF was originally created also defines whether the content of the PDF (e.g., text, images, tables) can be accessed or whether the content may be inaccessible (or "locked") in an image of the page. The problem with image-only PDF pages is that the content cannot be extracted from the PDF pages and content may not be able to be inserted into the PDF pages. This may also be a problem with other image file types, such as PNG, or JPEG files. The problem with the searchable PDF pages is that the content is often extracted with an OCR tool that may not be reliable. As such, a need exists to add metadata to a PDF document to electronically enable the PDF document.

SUMMARY

In general, in various embodiments, and with respect to FIG. 5, the system may implement a method comprising converting, by a processor, a document into an image (step 505); detecting, by the processor, words on the document (step 510); searching, by the processor, the words for keywords (step 515); searching, by the processor, for an object on the document (step 520); determining, by the processor, an object field based on the keywords and the object (step 525); creating, by the processor, a tag with metadata about the object field (step 530); and associating, by the processor, the tag with the object field (step 535).

The documents may include text files, image files, PDF, DOCX, DOC, TXT, PNG, HTML, JPEG or similar types of files. In various embodiments, the document may be a PDF document. The document may comprise multiple pages. The detecting of the words may comprise using OCR for detecting the words. The searching for the words may include filtering the words for the keywords. The keywords may comprise names of participants, names of participants that need to sign the document and/or notary language. The method may further include flagging the keywords. An object detection algorithm may be used in the determining the object fields. The object may include a geometric shape, line, field, parenthesis and/or colon. The object field may include a checkbox, bubble, circle, shape and/or symbol. The tag data may include the metadata that is associated with the document and/or added to the document. The metadata in the tag data may include a type of tag that is being used and electronic data related to the object field. The metadata may enable interaction with the document in order to effectuate an electronic transaction. The metadata may include data about the object field. The metadata may include a process for executing the document in the object field. The object field may include an electronic signature field and/or completing a checkbox. The processor may implement parallel processing and/or include multiple servers. The determining the object field may be further based on requirements and placements of the object field.

In various embodiments, the method may further comprise transmitting, by the processor, the object field to a participant for participant validation. The method may further comprise enabling, by the processor, the object filed to accept electronic entries. The method may further comprise storing, by the processor and in a knowledge database, at least one of a participant validation of the object field, a participant action associated with the object field or a participant change to the object field in association with at least one of the document, document type or participant account.

In various embodiments, the method may comprise determining, by a processor, metadata about a document; creating, by the processor, a hash from the metadata; storing, by the processor, an association of the hash, the metadata and the document in a knowledge database; creating, by the processor, a new hash for a new document; comparing, by the processor, the hash with the new hash; and determining, by the processor, that the new document has similar characteristics as the document based on the comparing.

In various embodiments, the document may include at least one of multiple documents in a package, a PDF containing one document or a PDF containing multiple documents. The title of the document may include at least one of a name or a form number. The determining of the metadata about the document may include obtaining existing metadata in the document. The determining of the metadata about the document may include determining at least one of a type or sub-type of the document. The determining of the metadata about the document may include determining a type of the document based on at least one of a title of the document, title of the document, location of text in at least a portion of the document, font of text in at least a portion of the document, footer in the document, number of pages of the document, words in certain locations or a library of known document titles. The title of the document may be determined based on at least one of a location of a first word, a font of a second word or a size of a third word. The metadata may include at least one of page numbers associated with at least some pages of the document or a description of different sections of the document.

The method may further comprise acquiring, by the processor, page number data about the document, in response to the document containing multiple pages. The method may further comprise acquiring, by the processor, page number data about the document by reviewing at least one of patterns of the page number data, common locations for page numbers, locations for a word page or a format of the page number data, in response to the document containing multiple pages. The method may further comprise organizing, by the processor, multiple pages of the document in at least one of chronological order or subsets of documents.

The creating the hash may be based on at least one of entity or user. The knowledge database may be organized by at least one of entity or user. The creating at least one of the hash or the new hash may comprise standardizing the object fields using a canonicalization process. The method may further comprise creating a unique key from at least one of the hash or the new hash. The method may further comprise incorporating, by the processor, the hash into a QR code that is associated with the document. The method may further comprise saving, by the processor and in the knowledge database, at least one of data associated with a false positive about an object field, an action associated with the false positive, a location of the false positive or document metadata. The method may further comprise removing, by the processor, an object field associated with a false positive from the new document, based on data associated with the false positive from the knowledge database. The method may further comprise removing, by the processor, an object field associated with a false positive from the new document after a threshold number of false positives are discovered in the documents, based on data associated with the false positive from the knowledge database. The method may further comprise providing, by the processor and to a user, information about an object field associated with a false positive, based on data associated with the false positive from the knowledge database. The method may further comprise at least one of adding or adjusting, by the processor, an object field in the new document, based on at least one of the object field being added or adjusted in the document in the knowledge database. The method may further comprise associating, by the processor, a QR code with the document, wherein the QR code identifies at least one of requirements for the document or a packet that may include the document. The method may further comprise converting, by the processor, the document to a new type of document, based on a type of the document. The method may further comprise requesting, by the processor, a service based on the metadata associated with the document.

BRIEF DESCRIPTION OF THE DRAWINGS

The accompanying drawings, wherein like numerals depict like elements, illustrate exemplary embodiments of the present disclosure, and together with the description, serve to explain the principles of the disclosure. In the drawings.

DETAILED DESCRIPTION

Figure 1:
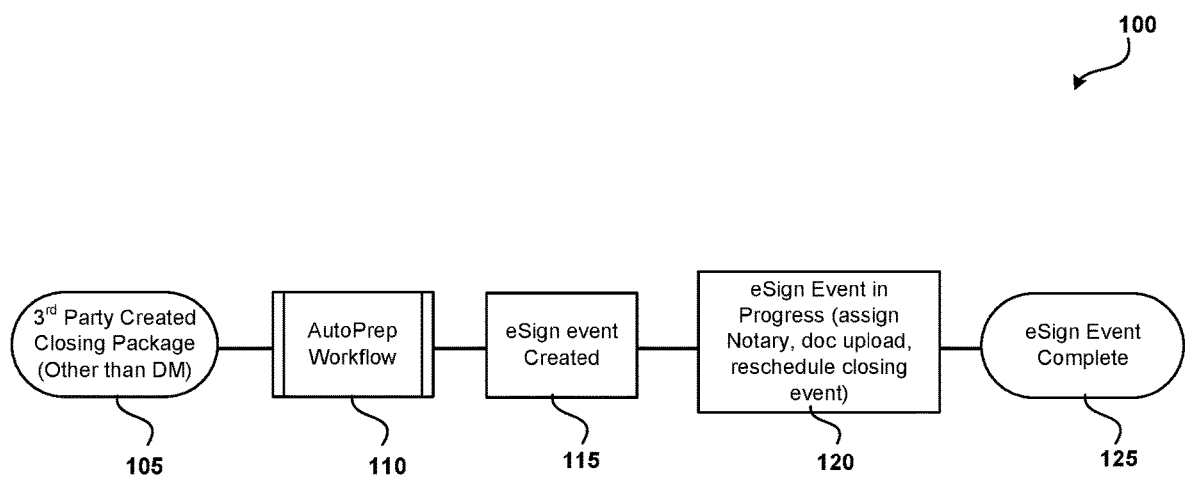
FIG. 1 shows a flowchart of a high-level overview of an exemplary transaction workflow, in accordance with various embodiments.

In general, the system may prepare documents to be digitally populated and/or digitally signed. In various embodiments, the system prepares the documents by implementing electronic tagging of the document, along with participant actions learning, document identification and business intelligence. The system may use OCR to acquire and analyze the text in a document. The system may determine keywords from the text. The system may use edge detection to determine the objects in a document. The system (e.g., using algorithms, artificial intelligence and/or machine learning) may use the keywords and objects to determine if a candidate object field exists. The object fields may include, for example, checkboxes, fields for initials, fields for data input by signers at the time of presentation ("post-fill"), notary fields, etc. The system may assign a weight to candidate object fields. The higher the weighting, then the system has more confidence that the candidate object field is a legitimate object field. The system may send the candidate object field to the participant for verification. If the candidate object field is not considered relevant or legitimate, the system may not send the candidate object field to the participant for verification. After the system is deployed on a document set, that document set (or any portion thereof) may be fully and intelligently e-enabled to allow an electronic transaction to proceed more efficiently. Moreover, the system automatically creates an event or workflow around the electronic transaction, making the process relatively seamless.

This disclosure may describe the documents as transaction documents or PDF documents, but the system contemplates implementing a similar method on any current or future type of document. Such documents may include, for example, text files, image files, PDF (standard or scanned), DOCX, DOC, TXT, PNG, HTML, JPEG or similar types of files. The system may convert any of these documents into an image for processing, as set forth herein. The document type may include, for example, draft documents, final documents, preliminary documents, memorandums of understanding, closing documents, title documents, loan documents, mortgage documents, licensing documents, sales documents, bills of lading, wills, trusts, security interests, promissory notes and/or other legal, personal or business documents. The disclosure may include an electronic transaction, but the system also contemplates any interaction with documents that may involve a human, a machine, one party, two parties, multiple parties, a notary, a witness, software, hardware, artificial intelligence, etc. Moreover, this disclosure may describe the process implemented by a system, but the process contemplates being implemented by the system, a tool, an app, a website, a SaaS offering, an algorithm, artificial intelligence, machine learning, expert systems logic, fuzzy text matching, text layer extraction, a human participant, a third-party system (that integrates or exchanges data with the system) and/or any combination. With respect to the SaaS offering, third-party applications may connect to the system to perform any of the processes discussed herein. For example, a third-party may perform the process for providing metadata to a document and allowing the document to be e-enabled.

Any of the steps discussed herein may be completed in parallel and/or may use parallel processing. The analysis of the document may be completed on a page-by-page basis to minimize the processing time for a document. The system may simultaneously engage multiple servers to analyze every page and to processes all the pages (or certain subsets of pages) at the same time. The number of servers may depend on the page volume in the transaction. Cloud technology may also be used to help to enable the use of such parallel processing. This parallel processing architecture improves the computer performance by allowing the system to read the documents at an extremely high rate, bringing down the processing time to below 15 seconds, regardless of the number of pages in a document package.

In general, as set forth in FIG. 1 and method 100, the system may receive, access or acquire a set of documents (step 105). The documents may be provided by the system or from a third-party system. The set of documents may be documents in physical form that are scanned by a scanner into a PDF file. The set of documents may be an electronic file of the set of documents sent by a third-party (via email, text, fax, etc.). The system may convert the electronic file to a PDF file. The system may electronically tag the documents (step 110), as set forth below in more detail. The system may establish an electronic transaction event (step 115). The transaction event may include a workflow comprising, for example, scheduling the event, assigning a notary to participate in the event, aggregating the desired documents, displaying the documents that need a signature, notifying the appropriate parties to enter the system and sign in the appropriate place on the documents, etc. Before, during or after the event, the system may assign a notary to participate in the transaction event, upload the desired documents to the event in the system, reschedule the event if a problem occurs, etc. (step 120). The transaction event may conclude upon one or more of the documents being electronically signed in one or more of the signature fields, along with other object fields being completed (e.g., checkboxes, fields for initials, post-fill fields, notary fields, etc.) (step 125).

Figure 2:
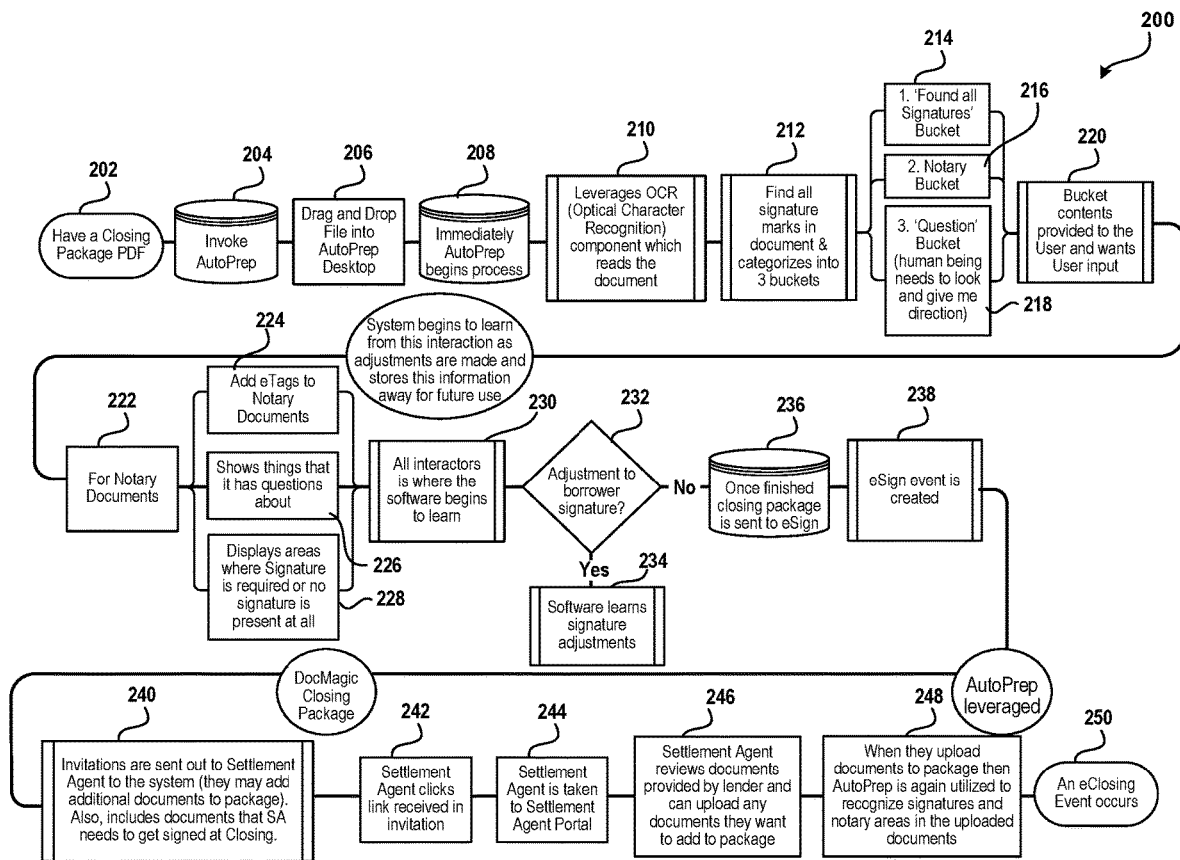
FIG. 2 shows a flowchart of a detailed exemplary transaction workflow, in accordance with various embodiments.

In various embodiments, as set forth in FIG. 2 and method 200, the system may receive, access or acquire a file containing a set of documents (e.g., from a lender) (step 202). The system may invoke the application that analyzes the set of documents and that electronically tags the documents (step 204). The file containing the set of documents may be dragged and dropped into the system (e.g., desktop application) (step 206). The system may begin processing the set of documents by electronically tagging the set of documents and adding metadata to the set of documents (step 208) by leveraging OCR and/or edge detection (step 210), as set forth in more detail below.

The system may find the object fields (e.g., signature fields) in the documents (step 212). The system may categorize the set of the documents based on finding all signature fields ("found all signature fields" bucket) (step 214), the documents requiring a notary ("notary" bucket) (step 216) or needing human (participant) intervention to provide the system with direction ("question" bucket) (step 218). With respect to the "question" bucket, the system provides the subset of documents to a participant and requests participant input (step 220). The system analyzes the participant input, adjusts the documents based on the participant input and stores the participant input and adjustments in a database, so the system (e.g., using artificial intelligence) may later access the database and learn from the participant input and adjustments. With respect to the "notary" bucket (step 222), the system may add electronic tags to the documents that require a notary (step 224), display questions about certain documents (or sections of documents) (step 226) and/or display areas where a signature may be required or no signature may be present at all (step 228).

For example, a template loan document may include six different lines for borrower signatures. The database in the system may store information about that particular type of template document including six signature lines. In some situations, only four borrowers may be part of the transaction. The system may have previously received input from a participant (e.g., lender) that only four borrowers are part of the transaction. The system may determine from other documents from the same transaction that the other documents only include four borrower signature fields. In that regard, the system may check the metadata or a database to confirm that the transaction only includes four borrowers.

The system may flag (e.g., highlight or send out a notice) the two extra lines as being an error or problem. The system may go further by recognizing that the fifth line has text below the line indicating a signature is needed on the fifth line by a certain category of person (e.g., settlement agent). The system may check the metadata or a database to determine if a settlement agent name is associated with the transaction. The system may (e.g., using artificial intelligence) may query the participant about who should sign the fifth line. Moreover, even if a page of a set of documents is missing (e.g., a page was not scanned in correctly) and that missing page included the six signature lines, the system may still flag an error. In particular, because the database in the system may have stored information about that particular type of template set of documents includes six signature lines, the system may still recognize that the set of documents is missing the six signature lines, even if the entire page with the six signature lines is missing.

The system (e.g., using artificial intelligence) may also learn from the actions performed on the documents in the notary bucket (step 230). The system may determine if an adjustment may be appropriate for a desired signature field (step 232). For example, the signature field may include an abbreviation of a name or just the term borrower/co-borrower without a specific name. In such a situation, the system may request the participant to confirm that the signature field is accurate or if the system should update the signature field with the full name of the person signing in that signature field. If an adjustment to the signature field is implemented, the system (e.g., using artificial intelligence) may learn from that adjustment (step 234) and implement the adjustment on similar documents for this participant account. After adjusting the signature field (if needed), the system may send the set of documents to be updated to allow the documents to accept an electronic signature (step 236). The system may create the electronic signature event (step 238). The system may send invitations to a settlement agent to access the system (step 240). The invitation may be in the form of an email or text with a URL link (step 242). Upon selection of the link, the settlement agent may be directed to the system (e.g., in the form of a portal) (step 244). The settlement agent may access the system, review the set of documents and add extra documents to the set of documents that the settlement agent may also need to have signed for a closing (step 246). If extra documents are uploaded, the system may also electronically tag the extra documents to recognize the signature fields and notary areas in the extra documents (step 248). The system may then allow the participants to continue with the closing by accepting the participant signatures into the documents and/or other entries into the documents (step 250).

Figure 3:
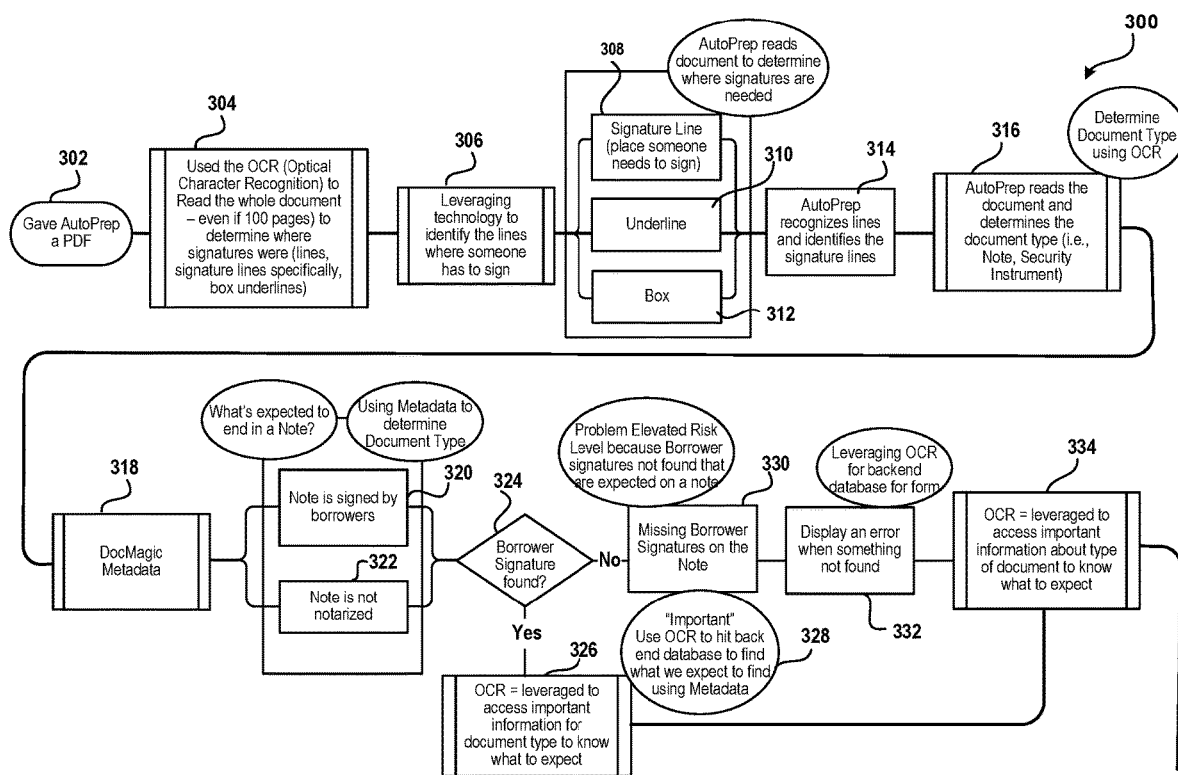
FIG. 3 shows a flowchart of an exemplary electronic tagging workflow (part 1), in accordance with various embodiments.

In various embodiments, as set forth in FIG. 3 and method 300, the system may receive a PDF document (step 302). The system may use OCR to review the document to determine where text exists in the PDF document and consider certain text as keywords (step 304). The system may use edge detection to identify lines and shapes where an input may be needed (step 306). The system may also include rules, data or metadata about various documents. For example, the system may include in its knowledge database that a Promissory Note needs a borrower signature, so if a borrower signature line does not exist, the system may provide a notice that a borrower signature line is needed. The system may determine the type of signer (e.g., borrower, statutory agent, witness, loan officer, etc.) that should be associated with a signature line based on keywords in the vicinity of the signature line. The keywords may include, for example, the terms signor, borrower, statutory agent, witness, and/or loan officer. Such keywords may be included in a database. A known name of the signor for a particular document may also be a keyword. The known name may be associated with that particular document via tagging or other means. The name of a signor may have been input by a participant and/or the system may determine the name of the signor from analyzing other documents in the transaction. The system may ask the participant if the system should insert a borrower signature line. The system may instead just insert the borrower signature line, without participant input. The items in the PDF document that may indicate an object field including, for example, a signature line (step 308), box (step 310), underline (step 312) or line (step 314).

The system (e.g., using OCR) may also review the document and analyze keywords to determine the document type (e.g., Promissory Note, Security Interest, etc.) (step 316). A database (or third-party service) may include a list of many known document types (e.g., document classifications) and/or metadata about keywords that may be used and found in certain documents. The system may also weight any of the keywords. The system may send the keywords to the database, and the database may determine the document type based on the keywords and/or the list of known document types. For example, a keyword of "promissory" would indicate the document may be a Promissory Note. Another way to determine the document type is for the system to review the metadata associated with the document (step 318). The system (e.g., using artificial intelligence) may determine what may be expected to be found in a certain document type. For example, a Promissory Note needs to be signed by the borrowers (step 320), a Promissory Note does not need a notary signature (step 322), etc. If a borrower signature field is found in the document (step 324), the system (e.g., using OCR) may obtain important information about the document type, so the system knows what to expect with this particular document (step 326). The system may use OCR to read the document and request more information form a backend database to help determine what may be expected on the document based on the metadata (step 328). If a borrower signature field is not found in the Promissory Note (step 330), the system may indicate an elevated risk level (e.g., display an error code) because a borrower signature field should be expected on a Promissory Note (step 332). The system (e.g., using OCR) may again obtain important information about the document type, so the system knows what to expect with this particular document (step 334).

Figure 4:
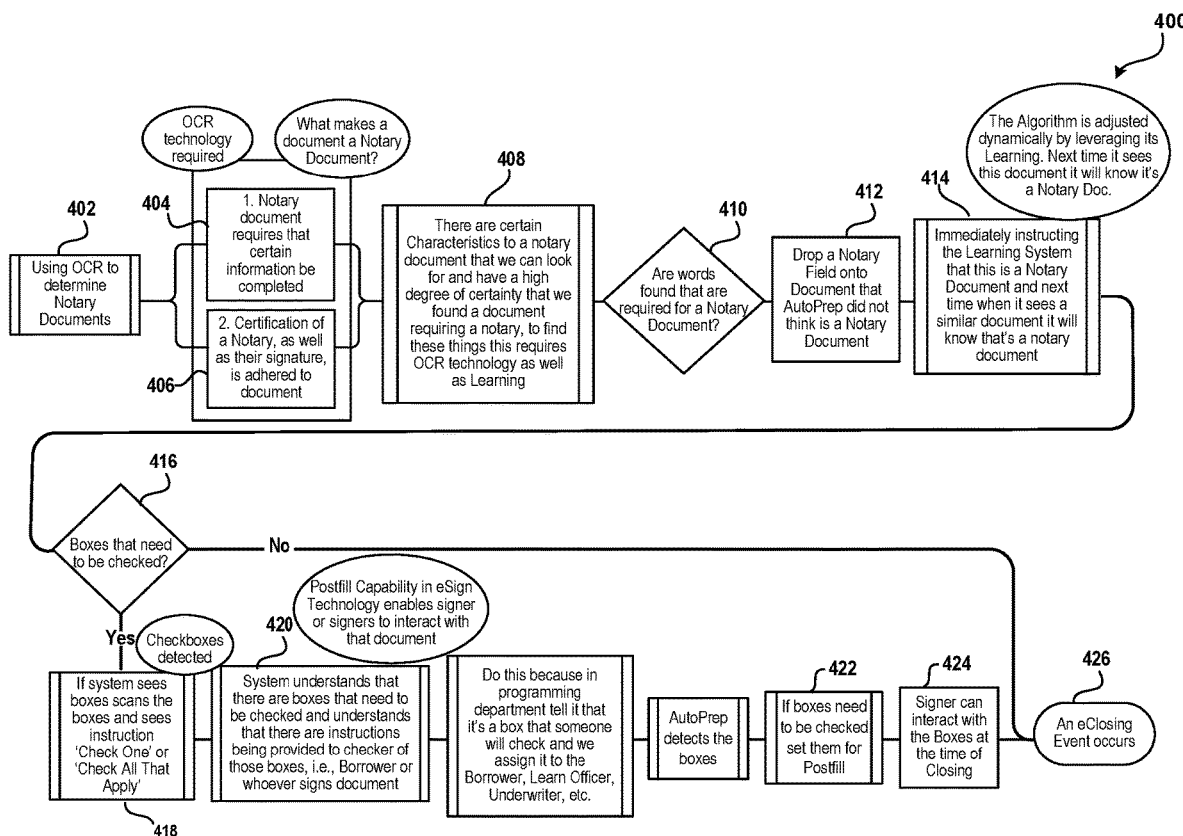
FIG. 4 shows a flowchart of an exemplary electronic tagging workflow (part 2), in accordance with various embodiments.
Figure 5:
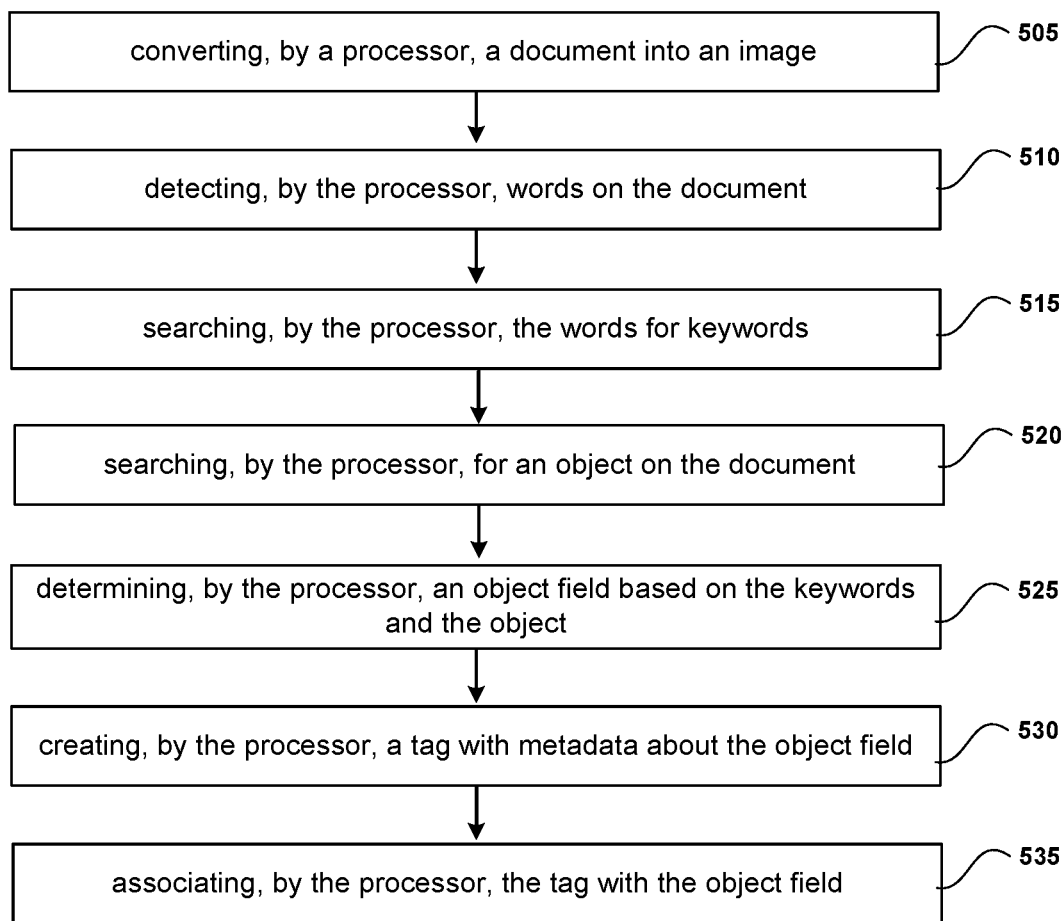
FIG. 5 shows a flowchart of a more detailed electronic tagging workflow, in accordance with various embodiments.

In various embodiments, as set forth in FIG. 4 and method 400, the system may use OCR (e.g., to find text and keywords) and a learning module to determine if the document includes one or more notary information fields (step 402). A notary document typically includes certain characteristics that provide a higher degree of certainty that the document requires a notary. A notary document typically includes blanks for extra information about the notary process (step 404). For example, the document may include fields for a certification of the notary and a notary signature (step 406). The system may use OCR and the learning module to determine characteristics that provide a higher degree of certainty that the document requires a notary (step 408). If the system finds words that are typically included in a document that includes a notary (e.g., my commission expires on . . . ) (step 410), the system may dynamically adjust its learning algorithm and instruct the learning module that the document or document type includes a notary. Thus, the next time the system sees a similar document or similar document type, the system may conclude that the document includes a notary (step 414). If the system does not find words that are typically included in a notary document, but the document is determined to need a notary, then the system may incorporate one or more notary object fields and text into the document (step 412). Similarly, the next time the system sees a similar document or similar document type (where the notary should be incorporated), the system may conclude that the document includes a notary (step 414).

With continued reference to FIG. 4, in various embodiments, the system may analyze a document to determine if certain object fields (e.g., lines, boxes, etc.) may exist that may accept input (e.g., a box that may be checked) (step 402). If no object fields exist in the document, then the system may approve the document for inclusion into the electronic transaction process (step 430). If the system determines that one or more object fields may exist in the document, the system may scan the areas around the object fields to determine if the document includes additional instructions about the boxes (step 418). For example, the document may include instructions to "check one" or "check all that apply". The system may send a notification to certain participants that the document includes checkboxes and one or more of the participants (e.g., borrower, loan officer, underwriter, etc.) will need to complete the checkboxes (step 420). The system may set the object fields that need to be populated for post-fill (step 422) to allow the participant to interact with the object fields during the closing transaction (step 424). The system may then approve the document with the object fields for inclusion into the electronic transaction process as part of an e-closing event (step 426).

Post-fill may include information that may be input after the automatic populating is completed (before or after signature is inputted). For example, the system may auto-populate a list of creditors, but at closing, the lender and/or borrower may need to add additional creditors as post-fill. The post-fill may be embedded into the PDF via adding an XML layer into the document. This allows a program to review the document and determine that such post-fill data was added to the document. In other words, OCR is not needed to re-scan the document to determine the newly added data.

In various embodiments, the system may perform mark detection by electronically tagging a document with tag data. The tag data may be metadata associated with the document or added to the document. The metadata may allow the system to interact with the document to effectuate an electronic transaction. The metadata may be data about one or more object fields and the process for executing the document in the object fields (e.g., electronic signature field, completing a checkbox, etc.). Electronically tagging a document may include, for example, conversion, OCR, object detection and vicinity assessment, as explained in more detail below.

In various embodiments, the conversion process may include converting all of (or any subset of) the pages of a document into images. The system may still retain the layers of the PDF document (e.g., the header, body, xref table and trailer layers) in association with the image. A benefit of working with an image of a page includes unifying the process for both native (the uploaded PDF) and scanned (image based) PDF documents. A native document is a text document that includes a binary code and the native document may have been supplemented with additional data over time. The scanned PDF forms an image that does not include the real text, and instead, includes a picture of the text. This enables the system (via OCR) to work with the same format and data set in the image. The OCR provides the specific location of each word, line, shape, etc., while the native PDF only states where certain information and content may start. As such, another benefit of working with an image is that comparing words and line positions relative to one another may be easier and more accurate since the OCR of the image provides one source that includes the exact locations of each content item.

After the page has been converted into an image, in various embodiments, the system may use an OCR engine on each page to detect and/or distinguish all (or a subset of) text within the image. The system may also use OCR to detect the location of the text in the image. After the OCR engine identifies all (or a subset) of the text, the system may filter or search to determine if certain text should be considered as keywords. The keywords may include, for example, the names of certain participants, names of people that need to sign the document, notary language, legal language, language associated with certain titles (e.g., President, homeowner, buyer, borrower, lender), etc. The system may flag the keywords. For example, as mentioned above, the system may recognize a notary section from the keywords "my commission expires on". The system may use the keywords and text to detect candidate object fields (e.g., signature fields, checkboxes and other fields) that may include options for participant interaction. The system may separately detect lines, graphics, etc. using, for example, edge detection, as explained below. The system analyzes objects (e.g., lines) and the vicinity of keywords to those objects. The other object fields that may provide an option for participant interaction include, for example, checkboxes, bubbles, circles, shapes, symbols or other objects in the document. For a cell, a keyword may be at the top of a cell. For a line, the keyword may be under the line. For example, if the word "borrower" exists in text only, then the system will not consider the term as a candidate for a signature. However, if the term borrower is right below a line, then the system will determine a signature field is needed for the borrower's signature.

In various embodiments, the system may use an object detection algorithm to search for object fields in order to process the page. The object detection algorithm may search for any object such as, for example, a geometric shape, line, field, parenthesis, colon or any other object (e.g., an object that does not include a string of letters). The object detection algorithm identifies any object in a document that may provide an option for participant interaction. The object detection algorithm may use edge detection to detect lines, circles, squares, blank (white) space, etc. The edge detection may find two lines for each actual line on the page (e.g., top of the line and bottom of the line) and may find lines that are part of letters (e.g., the letter "L" includes a vertical and horizontal line). As such, the algorithm may include a cleaning phase, a selection of sizes on the end of certain lines and/or removal of duplicate lines (e.g., a first line immediately above a second similar line). The system determines how the detected line is related to the rest of the shape or other artifact on the page. The systems may analyze the coordinates of the endpoints of the line and may compare the endpoints to the endpoints of other detected lines to determine if overlap of the endpoints (or lines) exists or the endpoints (or lines) are in a similar vicinity.

This object detection algorithm may recognize the requirements and placements of the object field to facilitate more appropriately associating the electronic tag with the object field. For example, states may have specific requirements for the notary seal, so the seal should not be scaled to a different size. Moreover, the system will not draw a line or insert a date longer than the space that is available on the document. In various embodiments, a tag may include metadata about the type of tag that is being used and the electronic data related to the object field. For example, a date tag may include data about the tag being a date tag and the data (e.g., month, day, year) that will be inserted into that object field.

After all (or a subset) of the keywords and objects have been identified, in various embodiments, the system implements a grouping algorithm to provide a vicinity assessment. The grouping may also group multiple object fields that are similar. For example, the system may group together six signature fields for six different borrowers on the same document. The vicinity assessment may assess the area in the vicinity of such keywords and objects. The vicinity assessment determines if these keywords are close to certain objects or object fields (signature fields, checkboxes, etc.) in the area surrounding the keywords and objects. The system may include certain thresholds for how close the keywords need to be near the objects, depending on the type of document, weighting factors for certain keywords or objects, etc. The thresholds may include a distance around an object to analyze keywords or other objects, so the system can limit the number of keywords and objects to analyze to the items that are closest to the object of concern. The system may use a threshold that is proportional to the size of the line. For example, if a line is half the width of a page, the system may set a larger threshold distance to check for keywords around such a longer line. The system may also determine if keywords above or below the line are less or more important (e.g., set less or more weighting) than keywords to the left or right of the line. The algorithm may include a definition of a valid interactive object field (e.g., valid signature field). The system may include a database of definitions for the interactive object fields such as, for example, a notary object field, a borrower object field, etc. If a keyword near the line matches (or is similar to) a keyword in the definition (e.g., borrower is a keyword near the line and part of the definition for a borrower signature line), then the line may be considered a candidate for an interactive object field. After determining the signature field and other object fields, the system may "e-enable" the fields into interactive object fields that can accept electronic entries. The system may record the location of each interactive field as a longitude and latitude point (or set of points, zone, region, etc.) on the document. The system may then send the documents to the participants that the system determines are the appropriate people to sign in the active fields. The participants may use any known software routine to download an electronic signature at the correct location or allow the participant to manually sign at the correct location (e.g., during an e-closing process).

If the system is confident that the interactive object field is accurate, then the system may not request validation from the participant. The system may be more confident based on more data indicating that the interactive object field is accurate (e.g., more keywords near the line, etc.). The system may be less confident if, for example, the knowledge database includes data about a certain document needing a notary, but a notary object field is not present. If the system determines that validation may be appropriate, these interactive object field candidates may be highlighted (e.g., red hue) on a participant interface or a note sent back to a participant interface for validation by the participant. The system may ask the participant to confirm which of the many borrowers in the deal should sign this specific borrower line.

The system may provide a list of the optional borrower names next to the object field for selection by the participant. The system may also allow the participant to insert a custom name near the object field. The system may also request that the participant confirm the spelling of a certain signatory name or if the signatory prefers a certain type of name (e.g., Robert or Bob). The system may provide to the participant requests such as options, categories or a number of items to review. The requests may include the number 5 on a page indicating that five different items need to be reviewed or input needed about that page. The system may move the participant around the document to show the participant the five different locations in the document that may request the participant feedback. The requests may be near the highlighted candidate object field. The system may also allow the participant to delete the candidate object field and/or provide feedback on why the object field should be deleted. The system may use this feedback to further build the knowledge database about that document or about that participant's preferences. For example, a participant may provide feedback that a certain borrower signature is not required for this particular type of loan documents or type of loan.

While in some scenarios the detection process can be completed with very high accuracy, by its nature, this kind of algorithm can be susceptible to false positives and rules bias. With respect to rules bias, the system may include rules to detect a field, but those rules may be based on false assumptions, so system tries to avoid the rules bias. To overcome this limitation and increase the accuracy of the detection algorithm, the system may learn (e.g., a feedback loop) from a participant's response regarding validation of the interactive object candidates. In that regard, in various embodiments, the system may automatically send any changes or actions provided by the participant via the participant interface to the server. Such changes or actions may be stored in association with the particular document, document type and/or participant account. In various embodiments, the input may be used to build a knowledge base (e.g., based on repeated inputs or actions) for each document, document type and/or participant account to use in future assessments of similar documents and/or document types by that participant. The system may include a noSQL large database of the knowledge input. The system may work with a trained artificial intelligence system, wherein each input may be used to train the algorithm. The system may also include regular learning in that, if 90% of the participants indicate a candidate object field is a false positive, then the system may learn to not include that particular candidate object field in the document and the system may train the algorithm accordingly. The participant may override any of the learning functions.

In various embodiments, the participants may set options. Such options may enable participants to set their configurations for how many times a specific change is provided by the participant and/or an action confirmed by the participant before the system recognizes such suggested change or action as "accepted." Such accepted changes or actions may be applied to all new document pages of the same document type. In various embodiments, the participant can also configure the system to accept certain specified actions from the beginning of the interaction. As used herein, a "new" document may be any additional or future document (or set of documents) analyzed by the system.

In various embodiments, the system may track any participant actions to better understand and learn from the participant actions. Such participant actions or participant changes may include, for example, deletion of a false positive signature field, translation (e.g., moving) of a signature field, scaling (e.g., changing a size) of a signature field, assignment of a specific signature field to a person or entity (e.g., borrower), addition of new tags, deletion of objects that are not intended to be interactive, modification of located tags, and/or identification of interactive objects specific to a participant role.

When a new document is processed by the system, the participant application may call the server to access the stored participant changes or participant actions. The system may use the stored participant actions to recall what the system has learned about this type of document in the past and apply the knowledge to the current document page being processed. The system may continue to conduct the routine for detecting the object fields, but the system may adjust the results based on the data and information from the knowledge database.

After detecting the fields and applying the knowledge, the system may identify the type of document being processed. The PDF processed by the system may contain one or multiple distinct documents within the single PDF file. Therefore, the system determines where within the PDF file that each document starts and ends (or identify any other location within the document). In particular, the system may analyze the artifacts found on every page (or a subset of pages) where the document may start and end. For example, the system may use the page numbers, titles and blocks of text to make this determination. If no page numbers, the system may determine that the document is a one-page document. If page numbers exist, the system may use the coordinates of the page numbers (to determine if the notations are on the top or bottom of the page), analyze if the notations are outside of the text margins (which is very common for page numbers) and/or analyze the format of the page numbers (e.g., page 1 of 10, 1/10, etc.) to confirm that the notations are page numbers. The system may validate that the notation is a page number if the first page has 1/10 and the second page has 2/10 in a similar location. The system may determine the margins based on where most of text/objects are or are not located on the page (text is typically not located in the margins).

After all the documents (or a subset) in a PDF file are identified, delineated, and categorized by type, the system may assign each document a different signature experience and logic. For example, certain documents may be labeled as notarized documents and grouped together for similar handling and management. In that regard, the system may recognize that a notarized document requires a notary certificate (e.g., a jurat) and will locate that field to apply the appropriate tags.

In various embodiments, the system may also leverage the metadata (e.g., data within the document) and/or business intelligence (e.g., contained in, or associated with, the documents) to understand the document. A native PDF may include metadata about how many pages exist, where the pages start and end, etc. The system may also use the object fields that were previously prepared for digital signature. For example, the system may have already prepared over 100,000 documents for digital signature in a particular location, so the system has a large database of knowledge. The system may assess the PDF file and apply the learned actions (from the knowledge database) associated with keywords, objects, object fields, document type and the category of each document contained in such PDF file. This allows the system to apply custom business rules on each type of document.

In various embodiments, the system may dynamically accept and store in a database the nature of these business rules and the execution plan for these business rules. The system may also associate these business rules with specific types of documents. Therefore, if a document type is found in the database, the system may first extract the business rules metadata and apply the business rules to the document.

The business rules may include, for example, object field validation post-processing, validation of the total number of pages in a document, validation of the number of signature marks for a document, validation of the signers assigned to signature fields and/or validation of the version of a specific document. Object field validation post-processing includes a document that the system already processed by determining where object fields are located, then the system requests input from the participant to validate those found fields, as discussed above. The system may validate the total number of pages in a document by processing each page separately, so the system may compare the number of pages determined from processing with the number of pages indicated in the metadata and/or the number of pages received by the participant. Validation of the signers assigned to signature fields may include a document that is known to need a notary signature, so the system determines that a notary should be included, even if a notary field was not previously determined during processing of the document. Validation may also include determining that the document should have the same number of notary seal regions as the number of notary signature lines.

Specialized algorithms (programmed to perform a specific task) may be used to handle the first phases of the system (e.g., before applying machine learning). The more times the system processes documents in additional phases, the system may build its knowledge database and increase the accuracy of the results. The further the system moves from the initial phase, the more participant feedback the system receives on a specific document. The combination of automated detection and participant feedback is then used in training or re-training a machine learning algorithm. Instead of continuous learning, the system may include re-training the machine learning algorithm to increase the accuracy of the algorithm. The machine learning algorithm may be very helpful in the electronic tagging process. Machine learning can easily be biased, especially if provided with inaccurate or non-representative training datasets. However, the system leverages what the system has already verified about certain documents and its database of forms within the system, and then applies such verified information to documents that originate outside of the system. In other words, the system includes an expansive existing database and rule sets associated with identified categories of documents. The system may include an immense amount of information about the document up-front, even before the system receives any custom, participant-specific actions or rules set by a participant. Using such existing databases and rules, the system may provide high-speed learning about the documents. The system builds a high-quality dataset fed by inputs from multiple participants and multiple documents to better train its machine learning algorithms and specialized algorithms. In this regard, the machine learning features help to close any gap in object field detection and document identification. As the system obtains more data, the closer the system may get to 100% accuracy.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, in most cases, in any of the operations described herein. Rather, as discussed above, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In general, the system may receive one document, multiple documents in package, a PDF containing one document or a PDF containing multiple documents. In response to the system receiving a PDF that contains many documents, with reference to FIG. 6, the system may determine metadata about each of the one or more documents (step 605). For example, the system may determine each of the document types. When processing and preparing documents for an e-closing, the system may need to know the document type, the document title, where the document starts and where the document ends. The system may continue to analyze the documents in different ways and obtain different information about the document, until the system obtains more certainty about the document based on the metadata. Moreover, similar information or metadata may be used for learning about the documents and/or labeling the documents. The document metadata can be saved in a knowledge database for helping to identify new documents.

More specifically, certain PDFs may include metadata about the various documents in the PDF. Such PDF metadata may be in the form of a manifest or table of contents on the side of the window that displays the PDF. The metadata may include page numbers, type of document, description of document, etc. However, many PDFs may not include sufficient (or any) metadata to indicate the contents of the PDF or where each of the documents may start and stop. To determine the proper order of the documents in the PDF, in various embodiments, the system may acquire the page number information from each of the documents. The system may review the entire document for page number data and determine a pattern for the page number data. The system may look at the bottom footer, the upper right, upper center and other locations that commonly include a page number. For example, the system may search for the term "page" (e.g., "page 3"). The system may also look at the format of the numbers. For example, the format may include "3 of 12" or "3/12", so the system my ignore the "of 12" or "/12" portions and determine that the document is page 3. The system may use the page number information to put the documents in page number sequential order. The system may also determine that different subsets of the documents exist. For example, the system may determine that a few documents that include "page 1" exist, so the system may determine that each page 1 document is part of a different subset of documents. The system may arrange each subset such that the documents that start with page 1 are the start of each subset of documents.

The system may determine the type of each of the documents in the PDF. The system may determine the type of each of the documents by looking at the title of the document. The system may look for a title by processing page 1 in each subset of documents. The system may presume that the title will most often be located on page 1. The title may be determined based on location of certain words (e.g., set off from text, on the top of the document), font of the words (e.g., all caps, bold) or the size of the words (e.g., larger than other text). For example, if the text size is twice as large as the body of the document, then the system may presume the larger text is the title. The system may also determine the type of each document based on various factors and/or metadata such as, for example, title, location of text, font of text, footer (e.g., with form number), number of pages, library of known document titles, text fields, object fields and other items in the document. For example, a certain type of document may always include a certain number of pages. Moreover, a sub-type of each type of document may exist (e.g., different types of promissory notes), so the system may determine the sub-type of the document. For example, a particular lender may use many custom promissory notes (e.g., with different interest rates), so that lender would have its own sub-types of promissory notes.

Figure 6:
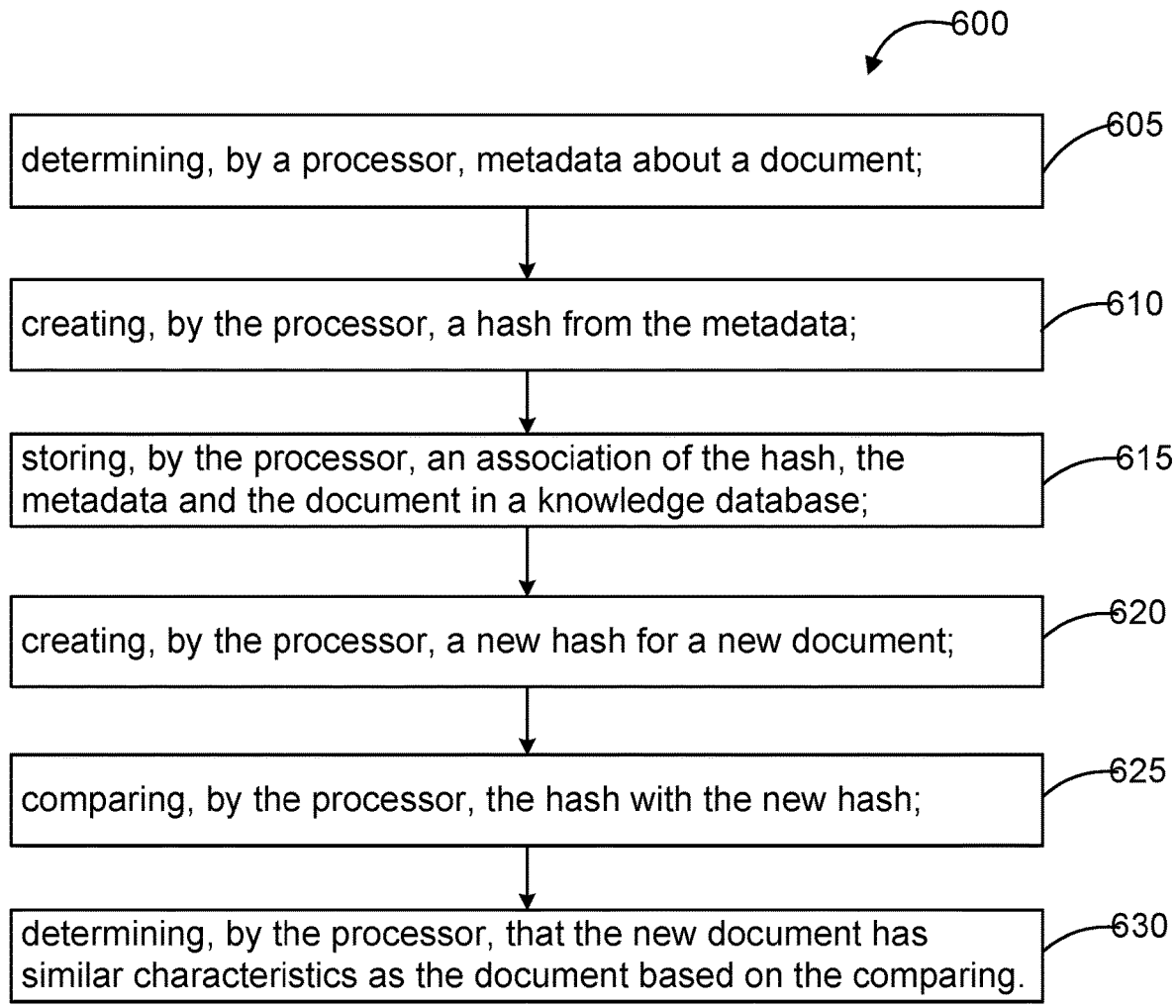
FIG. 6 shows a flowchart of a process for determining that a new document has similar characteristics as the original document based on comparing hashes of the documents, in accordance with various embodiments.

After the system determines metadata about the document, in various embodiments and with continued reference to FIG. 6, the system may create a hash of the metadata (step 610), then associate the metadata and hash with the document. The system may also store the association of the metadata, hash and document in a knowledge database (step 615). The system may use a knowledge database to help determine the type of document for a new document. The knowledge database may include a library of known document titles, known document types and/or known user-inputted object fields. The knowledge database may help determine a large percentage of the new document types. The knowledge database may be segregated by entity and/or by user (e.g., employee of the entity), so the system may learn and/or create a hash based on the different entities and/or based on the user. As such, the system may take any learnings from a particular user (or entity) and only apply those learnings to the clients associated with that user (or entity).

More particularly, in various embodiments, the system may create a new hash for a new document (step 620). The system may use the hash of the document to recognize the document in the document database. The system may compare the hash of the document in the knowledge database with the new hash of new document (step 625). Based on the comparison, the system may determine that the new document has the same or similar characteristics (or metadata) as the stored document (step 630). For example, the same combination of object fields (letters, text fields, and/or other items on the document) will always generate the same hash.

To facilitate creating the hash (or new hash) from the one or more object fields, the system may standardize the object field (e.g., input text field), using a canonicalization process. Canonicalization is the process of converting data that involves more than one representation into a standard approved format to help ensure that data conforms to canonical rules. The standardization of the object field may include, for example, removing spaces in a phrase, so only the text is used to create the hash. The system may use the hash of the various object fields to create a unique key. The unique key is stored in a database. Every time new information is obtained about the document and/or changes are made to the document, the system may use the unique key for the document to find the document in the system and update the document or update the metadata associated with the document. As such, the metadata in the knowledge database will now include the new information or the new changes. The hash may be incorporated into a QR code or any other indicia. The QR code or other indicia may be incorporated into the document.

If the system determines that the process produces a false positive about an object field in a particular location of a document, the system may save the data about the false positive, the location of the false positive (or action) and the document metadata in the knowledge database. For example, the system may determine that a signature field should exist in a location on a document. The system sends the information about the signature field to the user. The user determines that the signature field should not exist on that document or the signature field should not exist at that location on that document. The user may submit an action in response to disagreeing with the suggestion. For example, the action may comprise requesting to change the document which may involve deleting the suggested signature field or the user may indicate that the object field is not a signature field. The system may then record the user action (e.g., user input) into the knowledge database in association with that document. In response to the system analyzing a similar document in the future, the system may check the knowledge database to obtain information about such a document. Based on the previous knowledge of the false positive in the particular location, the system may not include the object field in that location in the similar document. In various embodiments, the system may provide the user with the knowledge from the knowledge database, so the user can decide to include or remove the learning in new documents.

The system may include different thresholds for deleting certain false positives. Such thresholds may be input by the user, set by the system, dynamically created, established for different clients, established for different users or established using AI or ML. For example, the system may include the threshold for a lower level user that the false positive must be determined five times in five of the same type of documents, before the system ignores the false positive. If the system reviews a similar document often, then the threshold will be met sooner. However, for a higher level user, the system may include a lower threshold (e.g., one time). The system may also override the threshold and mark the object field as a false positive object field, prior to reaching the threshold number of false positives. For example, even if the threshold requires experiencing five false positives, the system may implement the override and mark the object field as a false positive object field after experiencing two false positives. Moreover, the system may provide the metadata and the learning to the user. The user may override the thresholds and/or cancel the implementation of the learning onto the document.

The user may provide instructions to add an object field (e.g., signature field) to a document. The system may recognize that the user added the new object field, so the system stores the addition of the new object field in the knowledge database. As such, the system adds the new object field to all new documents of the same type. The user (or the system) may also re-size an object field in a document. For example, if a date field is too far to the right side or if a signature line is too long, then the user may move the date field to a more desirable location or shorten the signature line. The system may record the re-sized or changed object field in the knowledge database and add the change to all new documents of the same type.

As mentioned previously, in various embodiments, the system may store information learned about the document and save the information about the document in a dynamic way on the document. For example, certain documents may require a real ink signature, so the system may need to remove those documents from the digital documents. Such documents may include a QR code (or other indicia) that identifies the document and which packet of documents should include the particular documents. The system may also track user changes. The system may propose modifications to a new user based on the information stored in association with the document and/or based on the previous user changes to the document. The system may use the OCR process (discussed above) to find object fields, detect QR codes and/or detect e-tags. The e-tags may include the text in a PDF (e.g., the text that indicates a signature field). The system may augment the e-tags with additional information to allow the document to be ready for e-signature.

The system may read certain documents and extract any data from the document for any downstream processing. Based on the extracted data, the system may determine the type of document. Based on the type of document, the system may determine that the document should be converted to a new type of document. For example, the system may determine that a PDF document should be converted into an e-document. The system may then replace the PDF document with the e-document. More specifically, the system may find a promissory note in the e-closing package. The system may extract the variable data, create an XML file from the variable data in the PDF of the promissory note, send the XML file to the document generation engine and the document generation engine creates the e-Note (e.g., HTML document). The system then replaces the PDF of the promissory note in the document packet with the e-Note. However, various rules require that certain entities or people must be qualified to use an e-Note. As such, the system may provide a warning or prevent the PDF document from being converted into an e-document. Moreover, the system may provide a warning or prevent an e-signature on a document, where the system knows the document needs a manual notary. However, the system may allow the e-signature to proceed, if the system obtains data that an e-notary exists for the deal.

Moreover, the system may include a feature to request any type of service. For example, the system may provide the ability to submit a request for a notary, prepare a form for a notary and/or provide a notary for an e-closing. The system may detect that a notary is needed for certain documents. The system may automatically connect with a notary online or ask the user if the user would like the system to request a notary for the e-closing. The system may also determine that money may need to be transferred, so the system may automatically connect with certain financial institutions to arrange the transfer of funds.

The various embodiments and aspects of this disclosure are necessarily rooted in computer technology and overcome certain problems specifically arising in the realm of computers. In other words, various embodiments and aspects of this disclosure solve problems that only arose due to the use of computers. For example, the system parses digital files to determine where the signature lines and other elements of executable documents are within those files, so that the files and documents may be executed digitally.

Figure 7:
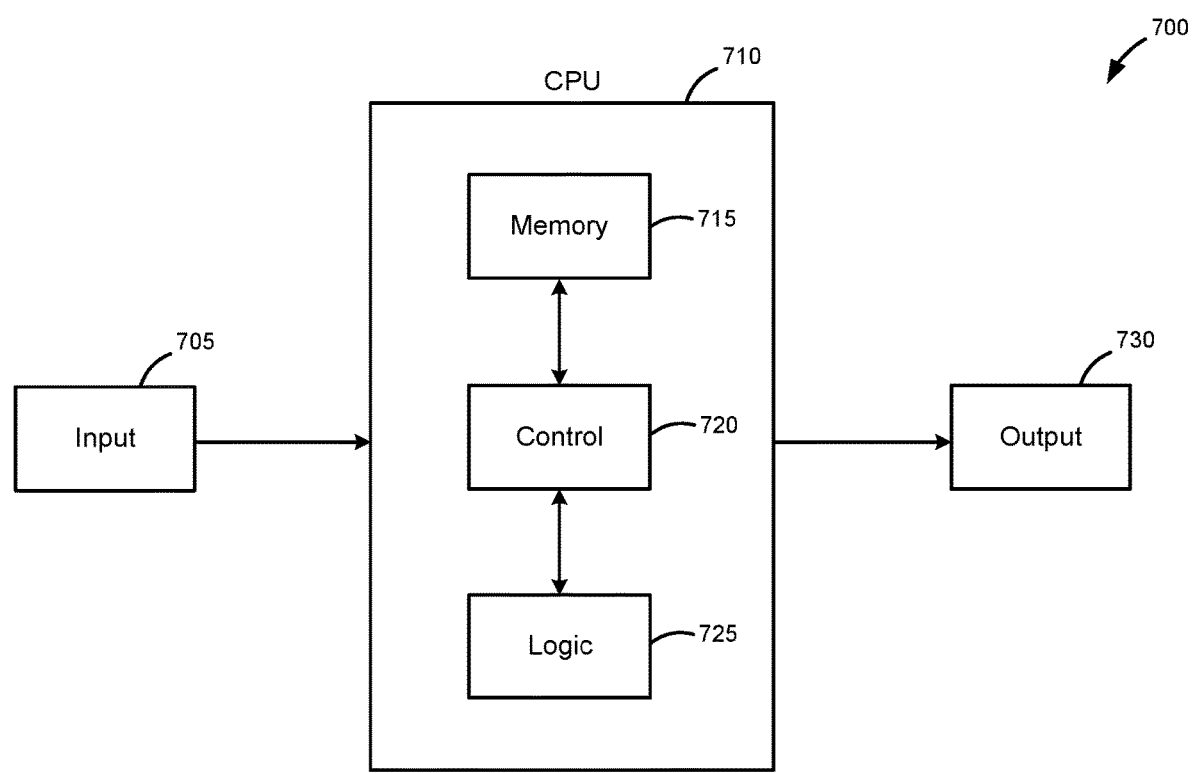
FIG. 7 shows a diagram of a computing system, in accordance with various embodiments.
Figure 8:
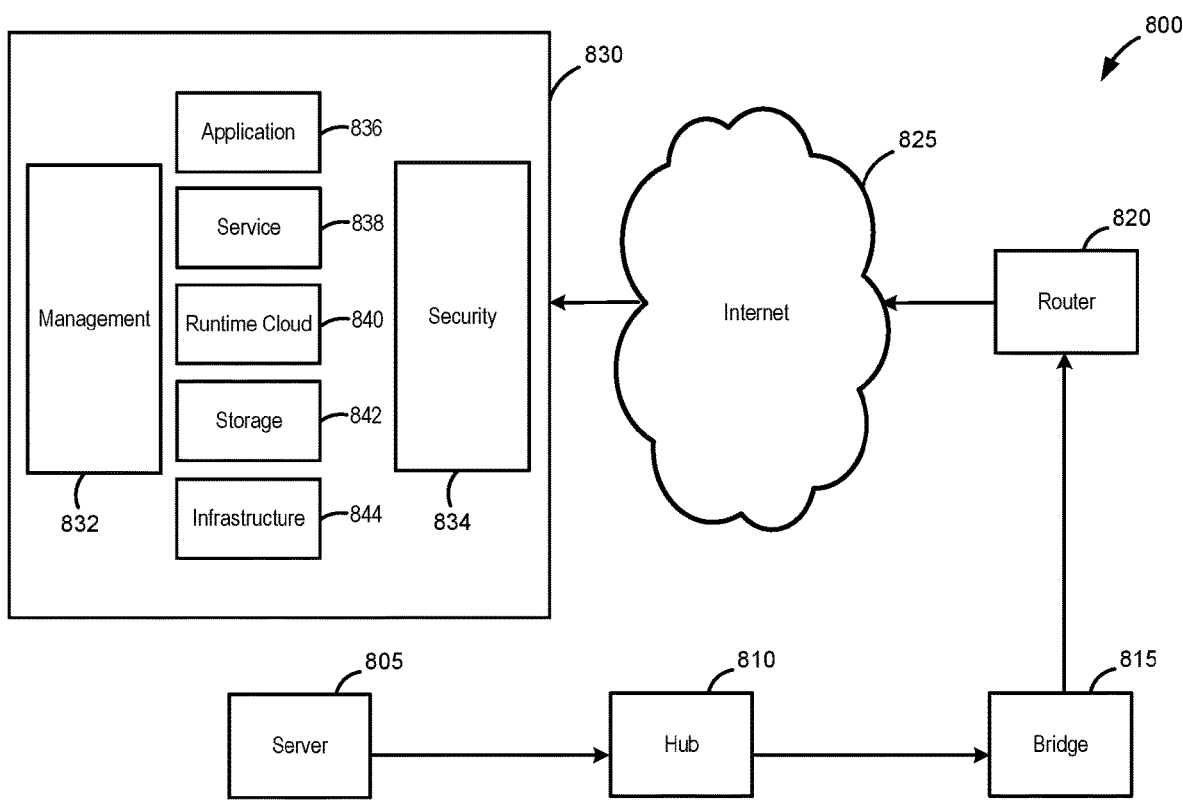
FIG. 8 shows a diagram of a cloud networking system, in accordance with various embodiments.

The computing systems and processors discussed herein may include any type of computing system such as the exemplary computing system of FIG. 7. In various embodiments, and with reference to FIG. 7, computing system 700 may include, for example, any type of input device 705, a central processing unit (CPU) 710 and an output device 730. The CPU 710 may comprise a memory unit 715, a control unit 720 and a logic unit 725. The networking systems discussed herein may include any type of networking system including, for example, a cloud network. In various embodiments, and with reference to FIG. 8, the cloud network 800 may include, for example, a server 805, a hub 810, a bridge 815, a router 820, the internet 825 and a cloud computing system 830. The cloud computing system 830 may include a management unit 832, a security unit 834, an application unit 836, a service unit 838, a runtime cloud 840, a storage unit 842 and infrastructure 844.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at predetermined intervals, periodically, randomly, once, more than once, or in response to a suitable request or action. Any of the information may be distributed and/or accessed via a software enabled link, wherein the link may be sent via an email, text, post, social network input, and/or any other method known in the art.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a participant, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to participant WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building participant interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEB SPHERE® MQ™ (formerly MQSeries) by IBM®, Inc. (Armonk, NY) is an example of a commercially available middleware product. An Enterprise Service Bus ("ESB") application is another example of middleware.

The computers discussed herein may provide a suitable website or other internet-based graphical participant interface which is accessible by participants. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the participant to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, participant computer may include an operating system (e.g., WINDOWS®, UNIX®, LINUX®, SOLARIS®, MACOS®, etc.) as well as various conventional support software and drivers typically associated with computers.

In various embodiments, the embodiments are directed toward one or more computer systems capable of carrying out the functionalities described herein. The computer system includes one or more processors. The processor is connected to a communication infrastructure (e.g., a communications bus, crossover bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

The firewall may include any hardware and/or software suitably configured to protect CMS components and/or enterprise computing resources from participants of other networks. Further, a firewall may be configured to limit or restrict access to various systems and components behind the firewall for web clients connecting through a web server. Firewall may reside in varying configurations including Stateful Inspection, ProX-Y based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third-party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, participant, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, participant, or the like. Furthermore, the security information may restrict/permit only certain actions, such as accessing, modifying, and/or deleting data sets. In one example, the data set annotation indicates that only the data set owner or the participant are permitted to delete a data set, various identified participants may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the participant, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on participant devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over conventional technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

Any communication, transmission, and/or channel discussed herein may include any system or method for delivering content (e.g., data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL™, a Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

I claim:

1. A method comprising:
converting, by one or more processors, a document into an image document, wherein the content is locked within the image of the image document, and wherein one or more object fields are not interactive;
searching, by the one or more processors, words on the image document for keywords, wherein the keywords include at least one of a name of a participant that needs to sign the image document or notary language;

determining, by the one or more processors, a type of an object on the image document;

determining, by the one or more processors, an existence and location of an object field in the image document, based on the keywords, the type of the object and the object, wherein the object field is configured to be enabled as an electronic field that accepts electronic data input;

creating, by the one or more processors, a tag with metadata about a type of the tag and the location of the object field, wherein the metadata includes data about executing the image document at the location in the object field;

associating, by the one or more processors, the tag with the object field, wherein the tag at least one of indicates that the image document requires a notary, displays questions about the image document, displays information about the image document or displays areas on the image document where a signature is required;

enabling, by the one or more processors using the metadata, interaction with the object field, wherein the enabling converts the object field to an interactive object field to allow the interaction, and wherein the interaction includes the interactive object field being configured to accept electronic data input;

determining, by the one or more processors, a type of the image document based on at least one of the interactive object field, a library of known document titles, known document types, known user-inputted object fields, entities or users;

creating, by the one or more processors, a hash from the metadata about the combination of object fields and the type of image document, wherein the hash converts the metadata into an output string with a fixed number of characters, and wherein the object field is configured to be enabled as the electronic field that accepts the electronic data input;

storing, by the one or more processors, an association of the hash, the metadata and the type of image document in a knowledge database;

creating, by the one or more processors, a new hash for a new image document;

comparing, by the one or more processors, the hash with the new hash; and determining, by the one or more processors, that the new image document has similar locations of the combination of object fields and is a similar type of image document as the image document based on the comparing.

2. The method of claim 1, further comprising:

creating, by the one or more processors, a unique key based on the hash;

finding, by the one or more processors, the image document based on the unique key;

updating, by the one or more processors, the image document and the metadata based on the unique key.

3. The method of claim 1, further comprising recording a user action to change the locations of the combination of object fields, in response to a false positive about the determining that the new image document having similar locations of the combination of object fields and being the similar type of image document.

4. The method of claim 1, further comprising performing, by the one or more processors, a canonicalization process of the combination of object fields, the known document titles, the known document types, the known user-inputted object fields, the entities and the users, wherein the canonicalization process converts data that involves more than one representation into a standard approved format to help ensure that data conforms to canonical rules.

5. The method of claim 1, further comprising adjusting, by the one or more processors, the type of the image document for an entity based on the users association with the entity.

6. The method of claim 1, wherein the determining the metadata about the image document includes determining a type of the image document based on at least one of a title of the image document, location of text in at least a portion of the image document, font of text in at least a portion of the image document, footer in the image document, number of pages of the image document, words in certain locations or a library of known document titles.

7. The method of claim 6, wherein the title of the image document is determined based on at least one of a location of a first word, a font of a second word or a size of a third word.

8. The method of claim 1, wherein the metadata includes at least one of page numbers associated with at least some pages of the image document or a description of different sections of the image document.

9. The method of claim 1, further comprising acquiring, by the one or more processors, page number data about the image document, in response to the image document containing multiple pages.

10. The method of claim 1, further comprising acquiring, by the one or more processors, page number data about the image document by reviewing at least one of patterns of the page number data, common locations for page numbers, locations for a word page or a format of the page number data, in response to the image document containing multiple pages.

11. The method of claim 1, further comprising organizing, by the one or more processors, multiple pages of the image document in at least one of chronological order or subsets of documents.

12. The method of claim 1, wherein the creating the hash is based on at least one of entity or user.

13. The method of claim 1, wherein the knowledge database is organized by at least one of entity or user.

14. The method of claim 1, wherein the creating at least one of the hash or the new hash comprises standardizing the object fields using a canonicalization process.

15. The method of claim 1, further comprising creating a unique key from at least one of the hash or the new hash.

16. The method of claim 1, further comprising incorporating, by the one or more processors, the hash into a QR code that is associated with the image document.

17. The method of claim 1, further comprising saving, by the one or more processors and in the knowledge database, at least one of data associated with a false positive about an object field, an action associated with the false positive, a location of the false positive or image document metadata.

18. The method of claim 1, further comprising removing, by the one or more processors, an object field associated with a false positive from the new image document, based on data associated with the false positive from the knowledge database.

19. The method of claim 1, further comprising removing, by the one or more processors, an object field associated with a false positive from the new image document after a threshold number of false positives are discovered in the image documents, based on data associated with the false positive from the knowledge database.

20. The method of claim 1, further comprising providing, by the one or more processors and to a user, information about an object field associated with a false positive, based on data associated with the false positive from the knowledge database.

21. The method of claim 1, further comprising at least one of adding or adjusting, by the one or more processors, an object field in the new image document, based on at least one of the object field being added or adjusted in the image document in the knowledge database.

22. The method of claim 1, further comprising associating, by the one or more processors, a QR code with the image document, wherein the QR code identifies at least one of requirements for the image document or a packet that includes the image document.

23. The method of claim 1, further comprising converting, by the one or more processors, the image document to a new type of image document, based on a type of the image document.

24. The method of claim 1, further comprising requesting, by the one or more processors, a service based on the metadata associated with the image document.

\* \* \* \* \*